United States Patent [19]

Martin

[11] Patent Number: 4,847,170
[45] Date of Patent: Jul. 11, 1989

[54] BATTERY CONTAINER AND ADAPTER

[75] Inventor: Gregory C. Martin, Rockville, Md.

[73] Assignee: Pulse Electronics, Inc., Rockville, Md.

[21] Appl. No.: 242,122

[22] Filed: Sep. 9, 1988

[51] Int. Cl.$^4$ .............................................. H01M 2/10
[52] U.S. Cl. ........................................ 429/1; 429/98; 429/99
[58] Field of Search .................. 429/1, 96, 97, 98, 99, 429/100; 362/194

[56] References Cited

U.S. PATENT DOCUMENTS

| | | | |
|---|---|---|---|
| 3,403,249 | 9/1968 | Bennett | 362/194 |
| 3,544,784 | 12/1970 | Grieger | 362/194 |
| 4,554,221 | 11/1985 | Schmid | 429/1 |
| 4,690,878 | 9/1987 | Nakamura | 429/1 |

FOREIGN PATENT DOCUMENTS 2085219  4/1982  United Kingdom ................ 429/1

*Primary Examiner*—Donald L. Walton
*Attorney, Agent, or Firm*—C. Lamont Whitham; Michael E. Whitham

[57] ABSTRACT

End of train marker light equipment (10) has been designed with a battery compartment (13) which can receive either a lead/acid battery (100), a Ni/Cd battery pack (250) or a pair of lantern batteries (350 and 352). In a first configuration, the lead/acid battery (100) mates with an electrical connector (30) positioned on the back wall (20) of the battery compartment (13). In a second configuration, an adapter (200) is fitted into the battery compartment (13) to receive a Ni/Cd battery pack (250). The adapter (200) includes an electrical connector (218) which is copmlimentary to the electrical connector (30). In a third configuration, a pair of lantern batteries (350 and 352) are fitted in the battery compartment (13) to contact a contact pattern (300) positioned on the back wall (20). One of the batteries (350) is fitted into the battery compartment (13) on its side while the other battery (352) is fitted into the battery compartment (13) at an angle with its edges cooperating with grooves (26 and 28) in the sidewalls (16 and 18).

8 Claims, 5 Drawing Sheets

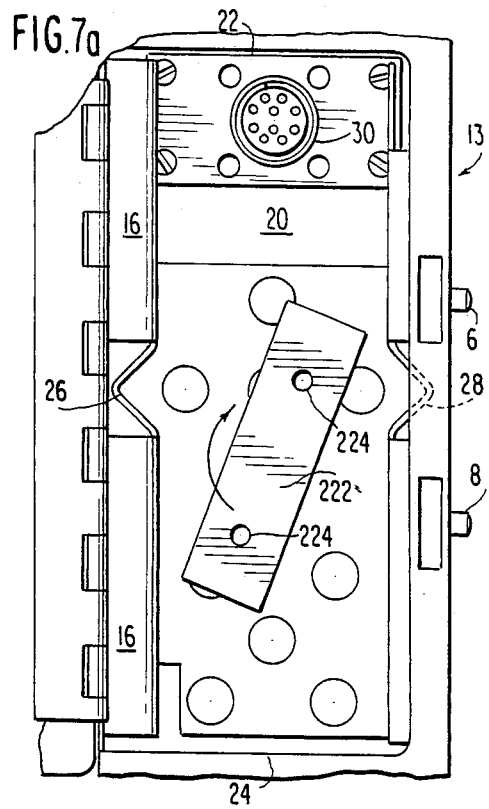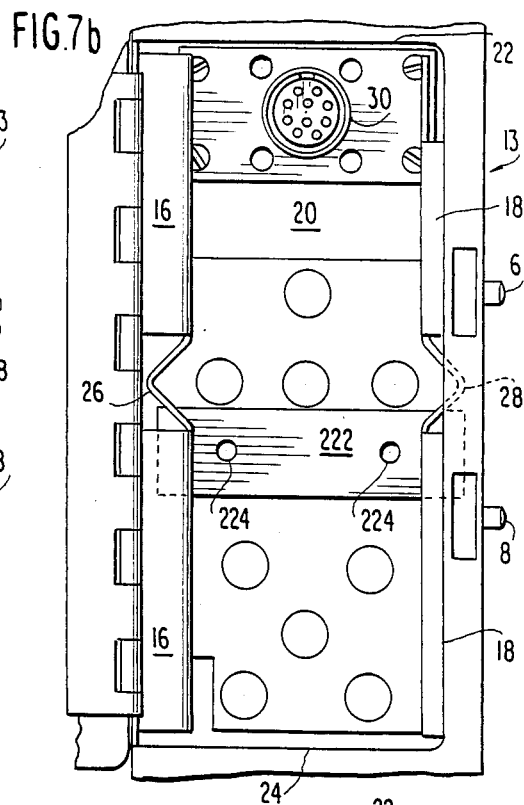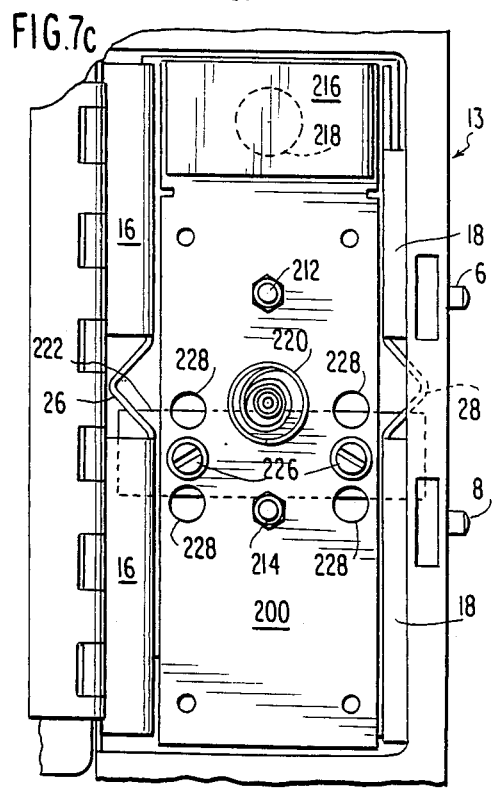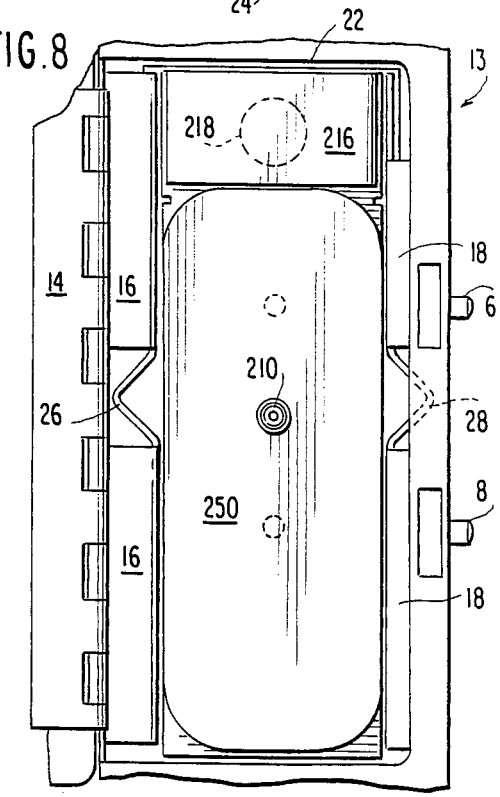

BATTERY CONTAINER AND ADAPTER

BACKGROUND OF THE INVENTION

1. Field of the Invention

The invention is generally directed to end of train marker light equipment and, more particularly, to a battery compartment construction for the marker light equipment which may accommodate a variety of different batteries to provide power for a marker light.

2. Description of the Prior Art

Federal regulations require marker lights to be positioned on the last car in a train and to be displayed during the night and during periods of restricted visibility. The marker light signals to locomotive engineers in other trains on the track that they are approaching another train. Marker lights are battery powered and, particularly in the case of trains operating without cabooses, are usually packaged with other end of train equipment. Pulse Electronics, Inc., of Rockville, Md., supplies end of train marker light equipment sold under the PULSAR trademark together with a rechargeable lead/acid battery. A fully charged lead/acid battery allows the end of train marker light equipment to flash for at least four days.

Some customers use a rechargeable Nickel/Cadmium (Ni/Cd) battery pack as shown and described in U.S. Pat. No. 4,554,221 to Schmid. These customers typically have other equipment that uses the Ni/Cd battery pack and would like to standardize on that battery or have an excess of these battery packs in stock and would like to use them instead of the lead/acid battery. In addition, there is also a need to be able to provide emergency back up power to the end of train marker light equipment at times when the lead/acid or Ni/Cd battery needs to be recharged.

SUMMARY OF THE INVENTION

It is therefore an object of this invention to provide a battery compartment in end of train marker light equipment which can be readily adapted to handle different types of batteries.

It is another object of this invention to provide a battery compartment which can accept either a lead/acid battery, a Ni/Cd battery or lantern batteries.

It is yet another object of this invention into provide a battery compartment which can accept a variety of battery power sources wherein a means is provided for making electrical connection with the battery terminals simply by sliding the battery into place and a means is provided for securing the battery within the battery compartment.

According to the invention, an end of train marker light includes a battery compartment that is accessible by a hinged battery compartment door. The battery compartment has been designed to receive at least three different kinds of battery power sources. In one configuration, a rechargeable lead/acid battery is received in the compartment with electrical connections being made at the top of the back wall of the compartment. The lead/acid battery is large enough to fill the entire compartment and can only be inserted in the correct orientation to mate with the electrical connector. In another configuration, a rechargeable Ni/Cd battery pack is placed in the battery compartment and is received by a field installable adapter that fits into the back of the compartment. A compressible spring is positioned around a large guidepost in the middle of the adapter. The guidepost extends into the Ni/Cd battery pack when the adapter and battery pack are joined. The spring serves to eject the battery pack when the battery compartment door is opened. The adapter is designed to utilize the electrical connector located at the top of the back wall of the battery compartment. The Ni/Cd battery pack can only be inserted in the correct orientation. In another configuration, a pair of standard lantern batteries are placed in the battery compartment in a unique configuration. Specifically, the back wall has a pattern of contacts for making connections to the lantern batteries, and the sidewalls have a pair of diametrically opposed grooves. The first lantern battery is inserted on its side and the second battery is inserted rotated forty five degrees with edges sliding in the sidewall grooves. Both batteries are inserted with contacts to the rear to mate with a contact pattern on the back wall of the battery compartment. The contact pattern for each lantern battery comprises a center contact, for electrically connecting the positive center terminal, and four outer contacts, each of which may electrically connect the outer negative terminal. The contact patterns permits a lantern battery to be inserted in any radial orientation with the correct electrical connection being made. The two lantern batteries occupy less space than the full volume of the battery compartment; however, the batteries are held securely within the compartment because the battery positioned at the forty five degree angle cannot move out of the sidewall grooves and the battery positioned on its side is held in place by the battery held at the angle.

BRIEF DESCRIPTION OF THE DRAWINGS

The foregoing and other objects, aspects and advantages of the invention will be better understood from the following detailed description of the preferred embodiment with reference to the drawings, in which:

FIGS. 7a through 7c are cut away front views of the battery compartment illustrating the steps for putting an adapter in the back of the battery compartment to accept a Ni/Cd battery pack;

FIG. 8 is a front view of the end of train marker light equipment showing the Ni/Cd battery within the battery compartment;

DETAILED DESCRIPTION OF THE PREFERRED EMBODIMENTS OF THE INVENTION

Figure 1:
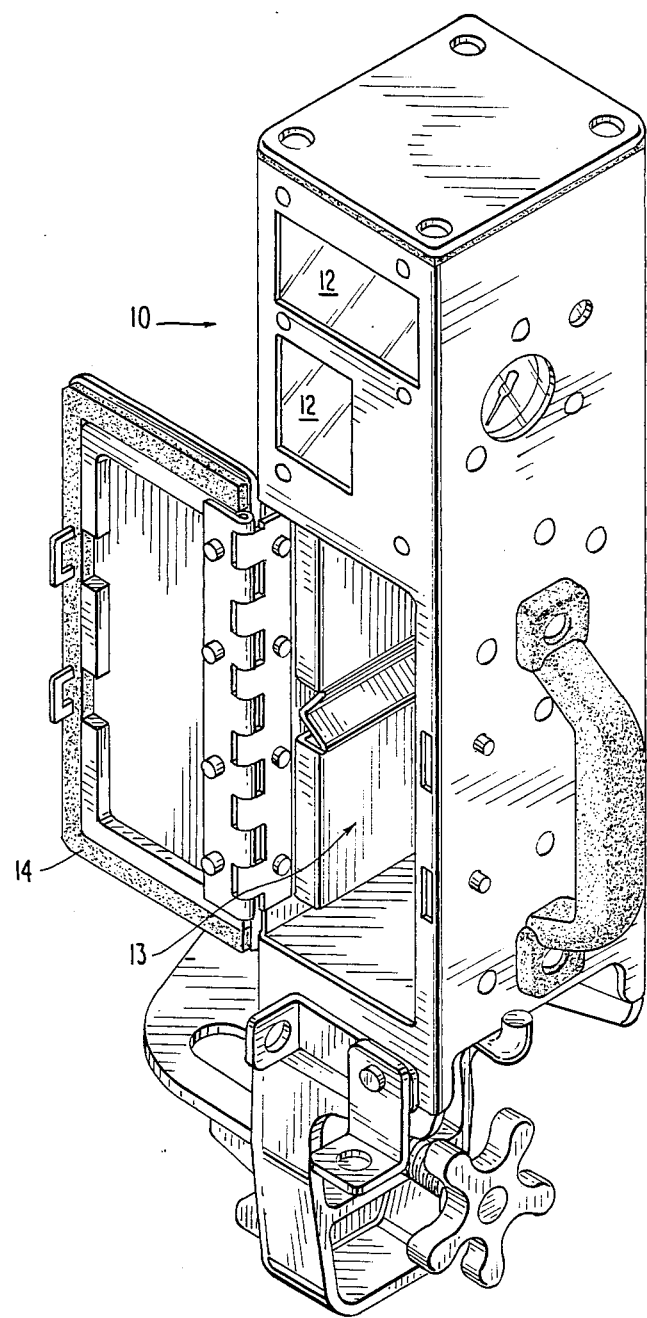
FIG. 1 is a perspective view of end of train marker light equipment showing a battery compartment door positioned ajar to expose the battery compartment.

Referring now to the drawings and, more particularly, to FIG. 1 there is shown end of train marker light equipment 10 which includes lights 12 for notifying locomotive engineers of the presence of a train. The end of train marker light equipment 10 is secured to the last car in a train as shown and described in the co-pending application Ser. No. 221,352, filed July 19, 1988. The end of train marker light equipment 10 is powered by a battery source which is placed within a battery compartment 13 that is to be covered by battery compartment door 14.

Figure 2:
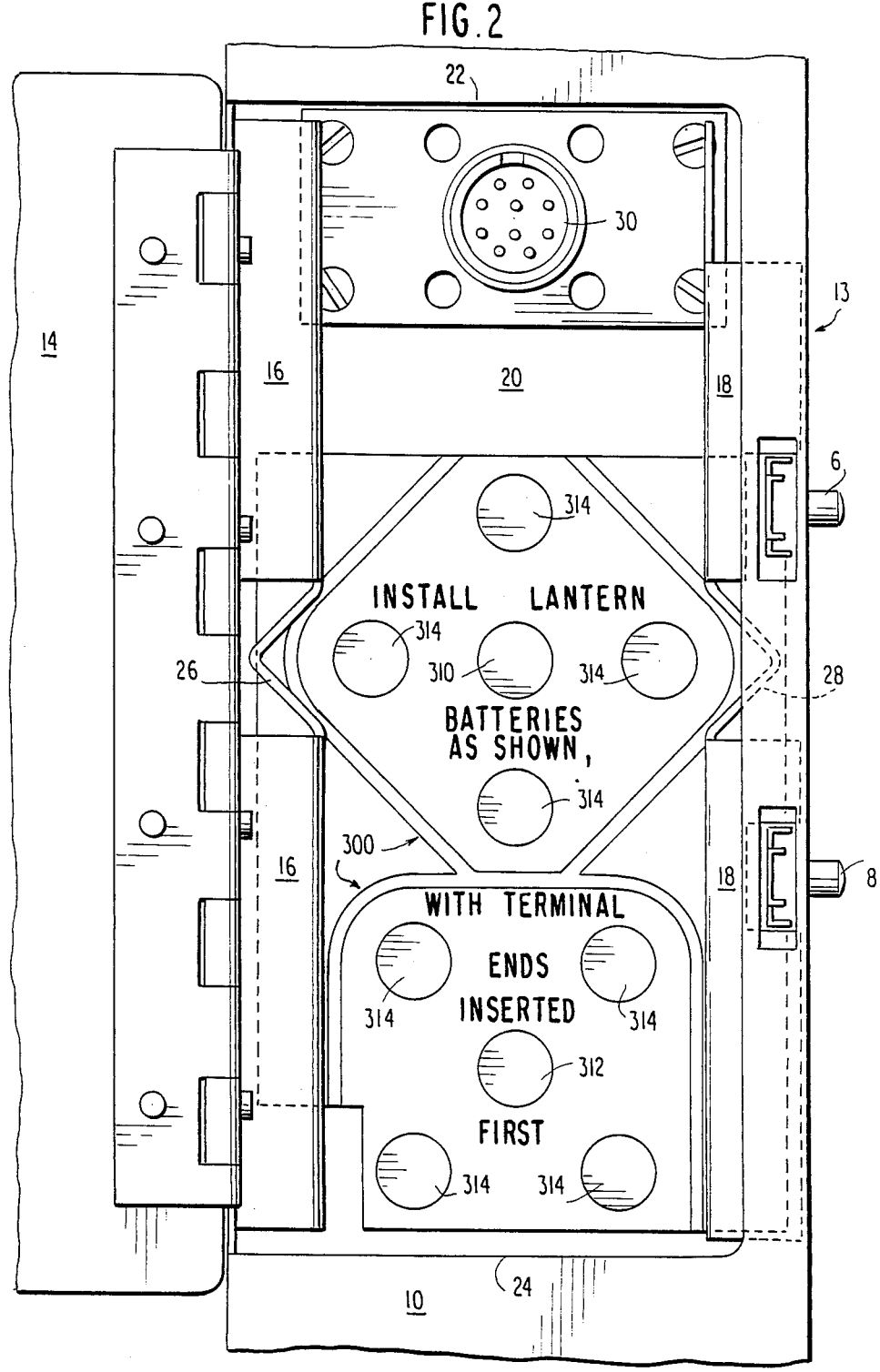
FIG. 2 is a front view of the battery compartment showing the diametrically opposed grooved sidewalls, the electrical connector at the top of the back wall of the compartment, and the electrical contacts on the back wall.

FIG. 2 shows the battery compartment 13 is defined by side walls 16 and 18, back wall 20, top wall 22, and bottom wall 24. The sidewalls 16 and 18 have diametrically opposed grooves 26 and 28. The battery compartment door 14 covers the compartment 13 and holds a battery source therein. Push button release locks 6 and 8 are used for locking the battery compartment door 14.

Figure 3:
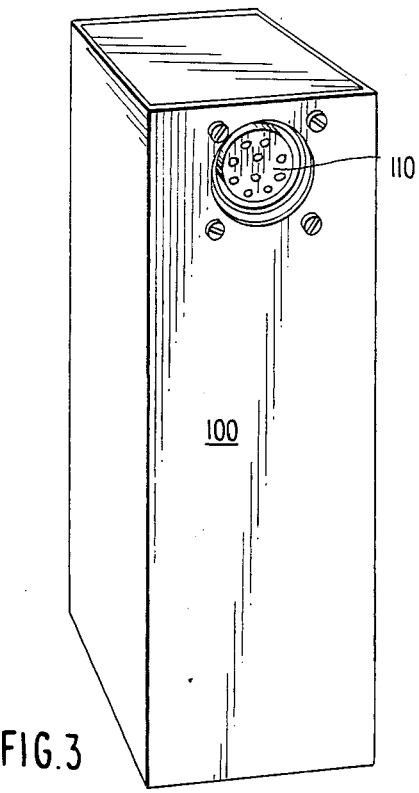
FIG. 3 is a perspective view of a rechargeable lead/acid battery showing an electrical connector which mates with the electrical connector in the battery compartment.

FIG. 3 shows a rechargeable lead/acid battery 100. The lead/acid battery 100 is large enough to fill the entire battery compartment 13 and has an electrical connector 110 which mates with a complimentary electrical connector 30 located at the top of the back wall 20 in the battery compartment 13.

Figure 4:
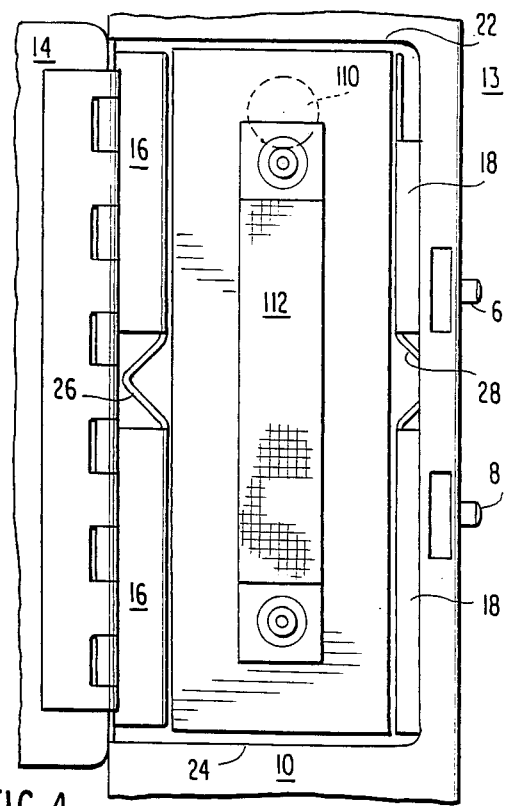
FIG. 4 is a front view of the end of train marker light equipment showing the lead/acid battery within the battery compartment.

FIG. 4 shows a first configuration of the invention where the rechargeable lead/acid battery 100 is placed within the battery compartment 13. The electrical connector 30 could be positioned on the bottom of the back wall 20 to achieve an alternative configuration. The arrangement allows the lead/acid battery 100 to slide into the battery compartment 13 and make the necessary electrical connections for providing power to the end of train marker light equipment 10. A strap handle 112 allows railroad personnel to withdraw the lead/acid battery 100 from the battery compartment 13.

Figure 5:
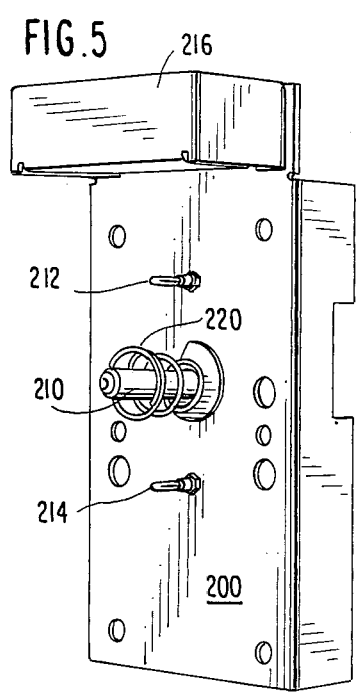
FIG. 5 is a top perspective view of an adapter to be placed within the battery compartment for connecting a Ni/Cd battery pack to the marker light equipment.
Figure 6:
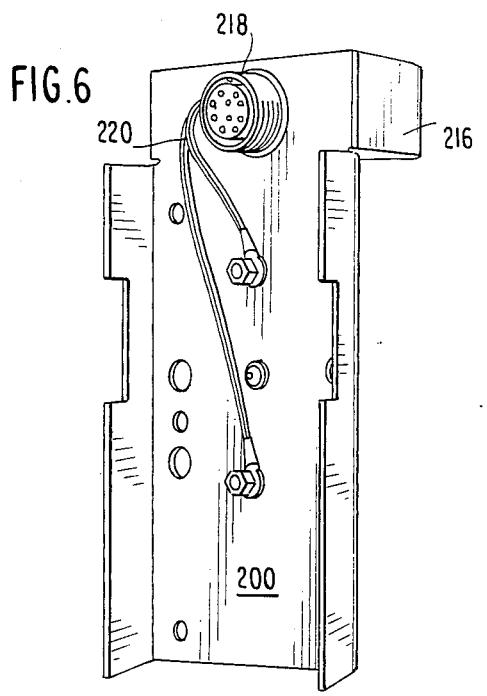
FIG. 6 is a bottom perspective view of the adapter shown in FIG. 5 showing electrical connections.

FIGS. 5 and 6 show top and bottom perspective views of an adapter 200 which will allow a rechargeable Ni/Cd battery pack, similar to that shown and described in U.S. Pat. No. 4,554,221 to Schmid, to fit within the battery compartment 13 and power the marker light equipment 10. The Schmid patent is herein incorporated by reference. The adapter 200 includes a central guide post 210 and two male electrical connectors 212 and 214, respectively. The guide post 210 and electrical connectors 212 and 214 extend into openings in the Ni/Cd battery pack. The adapter 200 includes an upper section 216 which holds an electrical connector 218 that is complimentary with the electrical connector 30 located at the top of the back wall 20 in the battery compartment 13. Electrical wiring 220 connects the male electrical connectors 212 and 214 located on the top side of the adapter 200 with the electrical connector 218 located on the bottom side of the adapter 200. It is anticipated that other means of interconnection, such as printed wiring boards, might also be employed. The guide post 210 is encircled by a helical spring 220. The spring 220 biases the Ni/Cd battery away from the adapter 200 and helps eject the Ni/Cd battery from the battery compartment 13 when the battery compartment door 14 is opened.

FIGS. 7a through 7c illustrate the means for mounting the adapter 200 within the battery compartment 13. A bar 222 having a pair of threaded sections 224 located near its ends is placed within the battery compartment 13 and rotated. FIG. 7b shows that the bar 222 is rotated to a position where the ends of the bar 222 are held in a space behind the sidewalls 16 and 18. FIG. 7c shows the adapter 200 is placed in the battery compartment 13 over top of the bar 222. The adapter 200 is connected to the bar 222 by lock washer and screw arrangements 226 which extend through the adapter 200 and join with the threaded sections 224 in the bar 222 below. Alignment holes 228 in the adapter 200 may aid in aligning the bar 222 with the adapter 200.

FIG. 8 shows a Ni/Cd battery pack 250 positioned within the battery compartment 13 of the marker light equipment 10. The upper section 216 and the guide post 210 are positioned on the adapter 200 such that the Ni/Cd battery pack 250 may only be inserted in the correct orientation. The upper section 216 of the adapter 200 fills the void between the Ni/Cd battery pack 250 and the top wall 22 of the battery chamber 13. As in the first configuration, the Ni/Cd battery pack 250 merely needs to be slid into the battery compartment 213 to make the necessary electrical connections.

Referring back to FIG. 2, a contact pattern located on the back wall 20 of the battery compartment is shown generally at 300. The contact pattern 300 has five points for possible contact with each of two standard lantern batteries. The central contact points 310 and 312 are for connecting the central positive terminal of a lantern battery. The outer contact points 314 connect the outer negative terminal of a lantern battery.

Figure 9:
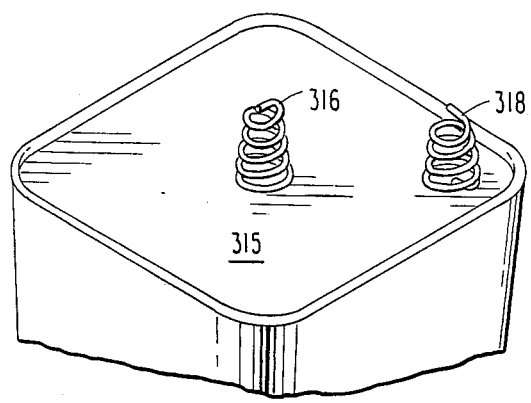
FIG. 9 is a perspective view of the top of a lantern battery showing the positive center terminal and the negative corner terminal.

FIG. 9 shows the top of a standard lantern battery 315 which includes a positive central terminal 316 and a negative outer terminal 318 positioned at one corner.

Referring back to FIG. 2, the contact pattern 300 has been designed to allow railroad personnel to place a standard lantern battery 315 in any orientation on top of the contact pattern 300 and still make a proper electrical connection between the central contact point 310 or 312 and the positive central terminal 316 and between any one of the outer contact points 314 and the negative outer terminal 318.

Figure 10:
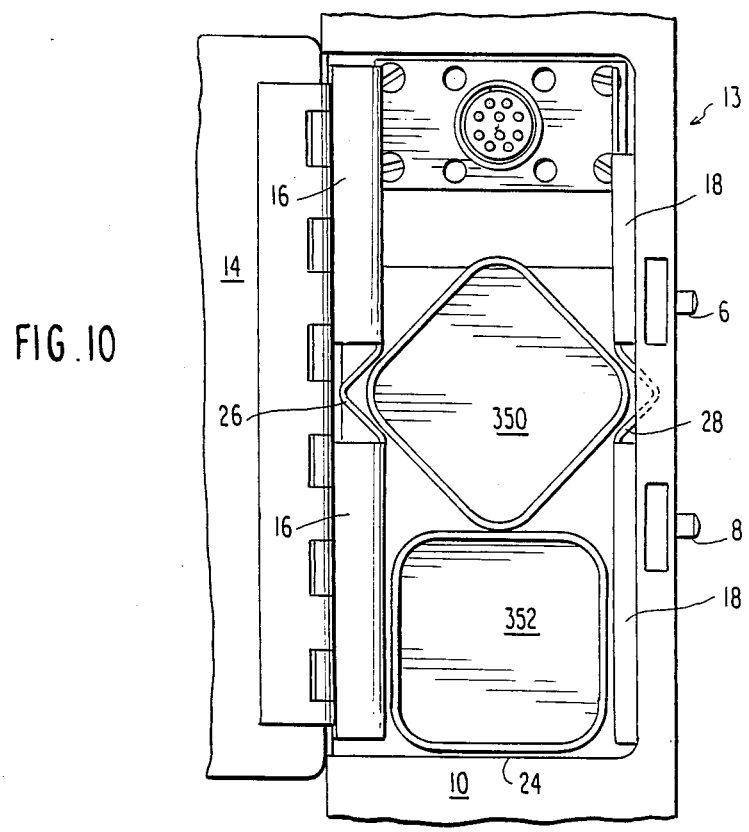
FIG. 10 is a front view of the end of train marker light equipment illustrating the orientation of a pair of standard lantern batteries within the battery compartment.

FIG. 10 shows a pair of standard lantern batteries 350 and 352 positioned within the battery compartment 13 of end of train marker light equipment 10. The lower battery 350 is placed on its side, on the bottom wall 24, with its terminals directed towards the contact pattern 300 on the back wall 20. The upper battery 352 is placed above the lower battery 350 at a forty five degree angle with edges of the battery 352 engaging the grooves 26 and 28 in the sidewalls 16 and 18, respectively. The important feature is that the angled battery is locked in place by the grooves 26 and 28 and it in turn locks the battery positioned on its side in place. As in the two previously described arrangements, the lantern batteries 350 and 352 merely need to be slid into place to make the necessary electrical connections to power the marker lights 12. The lantern batteries 350 and 352 are expected to be used in emergency situations when a rechargeable battery is out of service.

The invention has been described in terms of a preferred embodiment and best mode contemplated for the practice of the invention, i.e., a battery container and adapter for an end of train marker light. However, the invention clearly has broader application and may be readily adapted for other portable battery powered devices where a choice of battery power sources is desirable. Moreover, while the invention has been described in terms of the preferred embodiment which includes three specific configurations for placing different batteries within a battery compartment, those skilled in the art will recognize other configurations are considered within the scope of the appended claims.

Having thus described my invention, what I claim as new and desire to secure by Letters Patent is as follows:

1. Portable equipment including a battery compartment, said battery compartment comprising:

a rectangular frame having first and second end walls and first and second side walls, said first and second side walls having centrally located, diametrically opposed grooves, and a back plane including an electrical connector for connecting a rechargeable battery of a first type and an electrical contact pattern for contacting a pair of lantern batteries, said electrical connector being positioned on said back plane at a point near said first end wall, said first and second end walls and said first and second side walls defining a volume slightly larger than said rechargeable battery to permit said rechargeable battery to be inserted into said rectangular frame to mate with said electrical connector, said electrical contact pattern having a first region positioned on said back plane near said second end wall, said first region being arranged to contact a first of said pair of lantern batteries wherein said first battery is inserted into said rectangular frame on its side, said electrical contact pattern having a second region positioned on said back plane between said centrally located, diametrically opposed grooves in said first and second side walls, said second region being arranged to contact a second of said pair of lantern batteries wherein said second battery is inserted into said rectangular frame at an angle, said second battery being held by said grooves in said first and second side walls, said first battery being held by said second battery, said first and second side walls, and said second end wall.

2. Portable equipment including a battery compartment as recited in claim 1 wherein said first and second regions of said of said electrical contact pattern each include a central positive contact and four radially spaced negative contacts, said central positive contact for contacting a positive terminal on a lantern battery, said radially spaced negative contacts for contacting a negative terminal on said lantern battery, said four radially spaced negative contacts permitting a lantern battery to be inserted into said rectangular frame in any of four different radial orientations.

3. Portable equipment including a battery compartment as recited in claim 1 further comprising:

a battery compartment door parallel with said back plane and spaced therefrom by said rectangular frame, said battery compartment door for holding a battery power source within said battery compartment; and adapter means for adapting said battery compartment for receiving a rechargeable battery of a second type.

4. Portable equipment including a battery compartment as recited in claim 3 wherein said adapter means comprises:

a bar fitting in a space between said first and second side walls and said back wall, said bar including threaded sections;

an adapter having a top and bottom sides, said adapter being secured to said bar by screws which extend through said adapter joining with said threaded sections in said bar;

a complimentary connector positioned on said bottom side of said adapter for mating with said electrical connector on said back plane, said complimentary connector being partially housed in a first end section of said adapter;

a pair of male connectors positioned on said top side of said adapter for mating with a rechargeable battery of said second type;

electrical connecting means for electrically connecting said pair of male connectors with said complimentary connector;

a guide post positioned on said top side of said adapter for extending into an orifice in said rechargeable battery of said second type, said guide post and said first end section being spaced to allow said rechargeable battery to mate with said adapter in only one orientation; and biasing means positioned on said top side of said adapter for biasing said rechargeable battery of said second type away from said adapter, said rechargeable battery being ejected from said battery compartment when said battery compartment door is opened.

5. Portable equipment including a battery compartment as recited in claim 4 wherein said biasing means is a helical spring positioned around said guide post.

6. Portable equipment including a battery compartment as recited in claim 4 wherein said electrical connecting menas comprises electrical wiring positioned on the bottom side of said adapter.

7. Portable equipment including a battery compartment as recited in claim 3 wherein said rechargeable battery of the second type is a Ni/Cd battery pack.

8. Portable equipment including a battery compartment as recited in claim 1 wherein said rechargeable battery of the first type is a lead/acid battery.

* * * * *